June 17, 1930.  B. PAGE  1,764,466
DEVICE FOR SQUEEZING FRUIT SECTIONS
Filed Dec. 2, 1927

INVENTOR.

Patented June 17, 1930

1,764,466

UNITED STATES PATENT OFFICE

BRUNO PAGE, OF NEW YORK, N. Y.

DEVICE FOR SQUEEZING FRUIT SECTIONS

Application filed December 2, 1927. Serial No. 237,199.

My invention relates to improvements in a squeezer designed especially for table use for holding a section of lemon or similar fruit and squeezing the juice therefrom.

Such a squeezer has been described in United States Patent No. 913,365 of February 23, 1909, to Centa Doll. In the device described in said patent and illustrated in Figures 1 and 2 thereof there is disclosed a spring clamp or tongs consisting of a pair of arms fixedly mounted on a spit. To insert a section of lemon, or like fruit, the fruit section is pierced through by the spit, the arms of the spring clamp are manually separated, and the fruit section pushed upwardly between the arms of the tongs. By compressing the tongs the fruit section can now be squeezed without coming into direct contact with the fingers. Such a squeezer, having a spit upon which the fruit is spiked, has marked advantages over a squeezer constructed so that the fruit section is merely introduced between the clamp arms and so squeezed, as, in the latter case, upon squeezing, the fruit section breaks up in a haphazard way and the juice splashes in all directions, while with a device having a spit the pierced hole establishes a path for the juice; which can then be aimed at any desired spot.

The device disclosed in the above mentioned patent, while well adapted for holding and squeezing fruit sections, is, however, cumbersome and inconvenient with regard to their insertion into the device, as it requires three operations, viz, the spiking of the fruit section, pushing it upward on the spit, and the spreading of the tongs, and, as the operator of the device must use both of his hands in holding the squeezer and the fruit section in order to perform the operations necessary for its use, considerable skill is required to properly handle the device.

The object of my invention is to eliminate the difficulty encountered in the insertion of the fruit section in the squeezer, and I have, therefore, provided means whereby the spreading apart of the tongs is made more convenient, so that special skill is not required for insertion therebetween of the fruit section.

In the drawings forming part of these specifications, Figure 1 is a side view of one form of construction of my device showing it in its normal condition.

Figure 1:
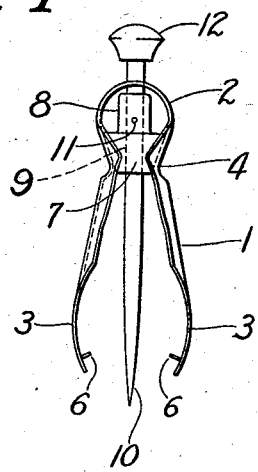
Figure 2:
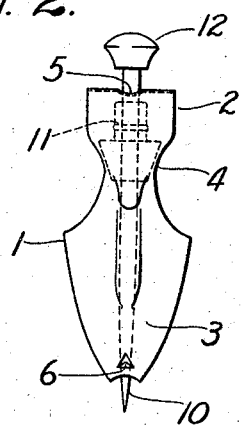
Fig. 2 is a front view of the device shown in Fig. 1, also in normal condition.
Figure 3:
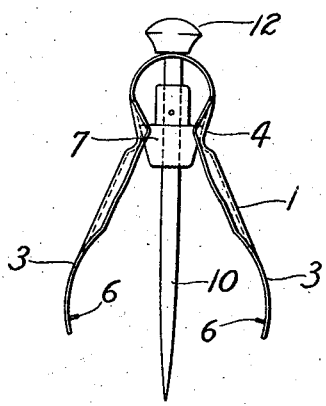
Fig. 3 is a side view showing the device of Figs. 1 and 2 in its operative condition.

According to Figs. 1 to 3, inclusive, the device consists of a resilient member 1 having a head or central part 2 of the shape of an inverted stirrup and having two extending flexible lips 3 forming tongs, the lips being connected to the head by means of a neck 4. The center of the head is provided with a perforation 5 and each lip carries a projecting point 6.

Within the head 2 of the resilient member is positioned a wedge 7 with an extension 8, both being provided with a central bore 9 in which fits a plunger or spit 10, the spit 10 and the wedge 7 being fixedly connected together by means of a pin 11.

The spit 10 projects upwardly through the perforation 5 of the resilient member and carries a knob 12 which is attached to it or forms an integral part thereof.

The neck 4 of the resilient member is so formed that it provides on one side for a suitable grip for two fingers, as, for instance, the index and middle fingers, of the operator's hand, and on the other side it acts as a guide for the wedge 7.

Normally the device is in the position shown in Figs. 1 and 2, whereby the plunger is maintained in its upward position by the spring pressure of the resilient member 1. When a fruit section is to be inserted in the device, the device is grasped between two fingers of one hand, as for instance the middle and index fingers and the knob is depressed by a third finger, preferably the thumb, which causes the downward movement of the wedge 7 and the spit 10 relative to the resilient member 1, thereby spreading the lips apart, The fruit section may be held in the other hand, though this is not necessary, and is now spiked on the spit and pushed upward, and, the lips 3 being separated, the fruit section is securely positioned in the squeezer, as, in addition to being spiked on the spit, the points 6 will, under the spring pressure of the lips, take proper hold of the fruit section. In this condition a fruit section can be served in my device with food dishes. To extract the juice of the lemon the lips are pressed together, whereupon the juice will run out along the spit without splashing and precisely in the direction desired.

As the size of lemons and similar fruits varies to some extent, I prefer to so dimension my device that when the plunger has been depressed to the full extent of its downward travel the wings will be spread enough apart so that a section of the medium-sized lemon can be freely introduced. Then, in the case of smaller sections the plunger has to be only partly depressed, while in the case of larger sections, after the plunger has been fully depressed, a slight pressure has to be exerted on the fruit section to introduce it between the wings. When the lemon section is removed the wedge 7, and with it spit 10 and the knob 12 are automatically returned by the resilient member 1 to their normal positions.

Figure 4:
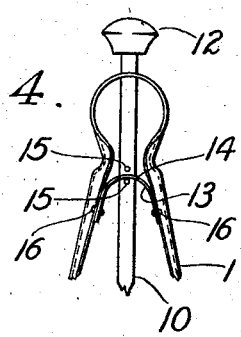
Fig. 4 is a fragmentary side view of another construction of my device, the parts shown being in their normal condition.
Figure 5:
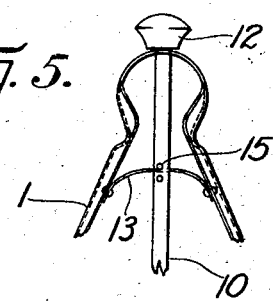
Fig. 5 is a fragmentary side view showing the parts of Fig. 4 in their operative position.

In Figs. 4 and 5 I have shown a somewhat modified construction of my device, whereby the plunger 7 has been replaced by a spring 13. The spring 13 carries on its central portion a perforation 14 adapted to receive the spit 10 and is riveted on its ends, by means of the rivets 16—16, to the resilient member 1. Two pins 15—15 of the spit 10 placed on each side of the spring 13 provide for connection between the spring 13 and spit 10. When the knob 12, with the spit 10, is depressed the spit carries the central portion of the spring with it, which thereby assumes the shape shown in Fig. 5 and causes the spreading of the lips 3. When the lemon section is removed the spring returns to its normal position and thereby also returns the spit and the knob to normal. It should be noted that in this construction the downward travel of the spit 10 should be less than required to bring the spring 13 into its fully stretched position.

While I have shown and described some preferred forms of my improved device for squeezing fruit sections, I do not desire to limit my invention to the exact embodiments illustrated herein but wish to have the following claims interpreted as broadly as is permissible in view of the prior art.

What I claim as new and wish to secure by Letters Patent is:

1. A device for squeezing fruit sections comprising an integral spring member including a pair of tongs, a plunger passing through said spring member and extending between said tongs, said plunger being movable longitudinally with respect to the spring member and having a pointed end for piercing the fruit section, and means operable upon depression of the plunger to separate said tongs.

2. A device for squeezing fruit sections comprising an integral spring member having a curved spring portion and a pair of tongs extending therefrom, said spring member being bent inwardly at the upper portions of said tongs, a plunger comprising a unitary element passing through the curved portion of said spring member and extending between said tongs, and a cam member fixed on said plunger and normally positioned within the curved portion of the spring member, said cam member being operative upon depression of the plunger to engage the bent in portions of the spring member to spread the tongs apart.

Signed at New York, N. Y., this 26th day of November, 1927.

BRUNO PAGE.